(12) United States Patent
Curt et al.

(10) Patent No.: US 11,601,027 B2
(45) Date of Patent: Mar. 7, 2023

(54) METHODS AND SYSTEMS FOR PERMANENT MAGNET MOTORS POWERING ELECTRIC SUBMERSIBLE PUMPS

(71) Applicant: RLT HOLDINGS, LLC, Missouri City, TX (US)

(72) Inventors: Edward Curt, Houston, TX (US); Kyle Meier, Houston, TX (US); Zhichao Yu, Houston, TX (US); Samuel Rodriguez, Houston, TX (US)

(73) Assignee: RLT HOLDINGS, LLC, Missouri City, TX (US)

( * ) Notice: Subject to any disclaimer, the term of this patent is extended or adjusted under 35 U.S.C. 154(b) by 654 days.

(21) Appl. No.: 16/667,448

(22) Filed: Oct. 29, 2019

(65) Prior Publication Data

US 2020/0136450 A1 Apr. 30, 2020

Related U.S. Application Data

(60) Provisional application No. 62/753,137, filed on Oct. 31, 2018.

(51) Int. Cl.
| | |
|---|---|
| *H02K 1/30* | (2006.01) |
| *H02K 5/10* | (2006.01) |
| *H02K 7/00* | (2006.01) |
| *F16D 1/04* | (2006.01) |
| *F16D 1/00* | (2006.01) |
| *F16D 1/08* | (2006.01) |

(52) U.S. Cl.
CPC ............... *H02K 1/30* (2013.01); *F16D 1/00* (2013.01); *F16D 1/04* (2013.01); *F16D 1/08* (2013.01); *H02K 5/10* (2013.01); *H02K 7/003* (2013.01)

(58) Field of Classification Search
CPC . H02K 1/30; H02K 5/10; H02K 7/003; F16D 1/04; F16D 1/08
USPC ........................................................ 403/166
See application file for complete search history.

(56) References Cited

U.S. PATENT DOCUMENTS

| | | | | |
|---|---|---|---|---|
| 2008/0061647 | A1* | 3/2008 | Schmitt | F04D 13/10 310/112 |
| 2013/0319764 | A1* | 12/2013 | Schaaf | E21B 7/068 175/50 |
| 2017/0098974 | A1* | 4/2017 | Clingman | F04D 13/10 |

FOREIGN PATENT DOCUMENTS

AT 299631 * 6/1972 ........... F16D 3/2052

* cited by examiner

*Primary Examiner* — Terrance L Kenerly
(74) *Attorney, Agent, or Firm* — Ditthavong, Steiner & Mlotkowski

(57) ABSTRACT

Systems and methods for connecting rotors between multiple permanent magnet motors. By coupling the rotors of multiple modules, torque may be transferred while maintaining the angular alignment between the stator and rotor magnetic fields of each individual permanent magnet motor.

27 Claims, 7 Drawing Sheets

METHODS AND SYSTEMS FOR PERMANENT MAGNET MOTORS POWERING ELECTRIC SUBMERSIBLE PUMPS

BACKGROUND INFORMATION

Field of the Disclosure

Examples of the present disclosure relate to systems and methods for permanent magnet motors powering downhole electrical submersible pumps. More specifically, embodiments relate to a coupling system that is configured to synchronize the angular alignment of magnetic fields of multiple permanent magnet motors.

Background

Artificial lift is a process utilized to move hydrocarbons and fluids within the wellbore located in a geological formation to the surface. When the natural drive energy of the reservoir located in the formation is not strong enough to flow hydrocarbons to the surface, artificial lift is employed downhole to recover more of the hydrocarbons at the surface.

Conventionally, to create artificial lift systems such as an Electrical Submersible Pump ("ESP"), a centrifugal pump is positioned within a wellbore that communicates with a production zone, wherein the centrifugal pump is connected to an induction electric motor. This electric motor is normally a three phase, alternating current ("AC"), induction motor operating asynchronously which means the induced magnetic field of the rotor system rotates slower than the magnetic field created in the stator electric winding coils. Due to the geometric constraints of downhole environments, conventional systems may utilize multiple induction motors that are connected from end to end in tandem. These induction motors may include a simple electric motor design with no requirements of orientation of the spinning rotor systems. As such, connecting induction motors in tandem assemblies is straightforward because there is no need to align an angular position of multiple tandem motors.

Other conventional ESP systems utilize synchronous, three phase, AC, permanent magnet motors instead of induction motors due to improved electrical efficiency, flat operating torque curves, shorter overall lengths, and lower operating temperatures. Permanent magnet motors operate in a synchronous state where the rotor utilizes permanent magnets that create the magnetic field necessary for the motor to operate. This rotor with permanent magnets operates synchronously with the stator electric winding coils and operating out of phase or misaligned will result in decreased performance. Due to the difficulties of synchronizing the angular alignment of the magnetic fields in multiple permanent magnet motors, current downhole permanent magnet motors do not operate in tandem connected configurations. This has led to companies utilizing a long single motor section to make up an entire permanent magnet motor assembly resulting in a single available horsepower rating per length, which is often larger than what is required for a given application. Conversely, there exists a limitation to a maximum power output from a single permanent magnet motor section where an application requires more motor power output.

Accordingly, needs exist for systems and methods for coupling multiple permanent magnet motors that are configured to operate in tandem.

SUMMARY

Embodiments disclosed herein describe systems and methods for connecting rotors between multiple permanent magnet motors while maintaining the synchronization of the magnetic fields of the permanent magnet motors. By coupling the rotors of multiple permanent magnet motors, torque may be transferred between the motors while maintaining the angular alignment between the stator and rotor magnetic fields of each individual motor. By coupling more permanent magnet motors together, more torque and horsepower are produced.

Systems described herein may be configured to allow a male member coupled to a first rotor to be inserted into a female member coupled to a second rotor. While coupled, rotor magnetic fields and stator electric winding coils associated with the multiple permanent magnet motors may be aligned, which may synchronously rotate the rotors. While the male and female members are coupled together and aligned, a retention fastener, a device used for mechanical retention, may be tightened to increase the friction between the male and the female members to effectively lock the members together.

Embodiments include a first motor module, a second motor module, a first member, a second member, and a retention fastener.

The first motor module may be a permanent magnet motor. The first motor module may have a first rotor coupled to the first member, first stator electric coil windings with a first winding pattern, and first rotor permanent magnets, which have first poles. The first poles may be configured to form a first magnetic field.

The second motor module may be a permanent magnet motor. The second motor module may include a second rotor coupled to the second member, second stator electric coil windings with the first winding pattern, and second rotor permanent magnets, which have second poles. The second poles may be configured to form a second magnetic field. Responsive to applying electricity to the first stator electric coil windings and the second stator electric coil windings, the first and second rotors may rotate to allow the synchronization and alignment of the first permanent magnet motor and second permanent magnet motor.

The first member may be a male tapered element that is coupled to a distal end of a first rotor of a first permanent magnet motor. The first member may include a first body with a first diameter and a head with a variable diameter, wherein the variable diameter is tapered. The variable diameter of the head may have a first proximal diameter that is greater than the first diameter and a first distal diameter that is less than the first diameter. As such, the variable diameter may taper from a size that is greater than the first diameter of the first body to a size that is smaller than the first diameter of the first body.

The second member may be a female tapered element that is coupled to a proximal end of a rotor of a second permanent magnet motor. The second member may have a second body with a second diameter and a second end. The second end may include a bore, depression, cutout, etc. with an inner diameter that decreases in size. The bore may have a third diameter that decreases in size, such an upper diameter of the bore has a diameter that is greater than the second diameter and the lower diameter of bore is smaller than the second diameter.

In embodiments, the first end of the first member may be configured to be moved axially along the central axis of the system to be inserted into the bore of the second member. While the first end of the first member is inserted into the bore, the first member and second member may rotate independently from each other if there are not forces acting towards a central axis of the system.

The retention fastener may be configured to be tightened and loosened to apply a variable amount of friction between the first end of the first member and the bore of the second member. At lower friction values, the first rotor and the second rotor may be configured to slip with respect to one another until proper alignment between the first permanent magnet motor and the second permanent magnet motor is achieved. At higher friction values, the relative rotation between the first member and the second member may be locked. This may allow torque to be transmitted from the first rotor to the second rotor, and vice versa.

By coupling multiple rotors associated with multiple permanent magnet motors in tandem, different values of torque and horsepower can be achieved.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
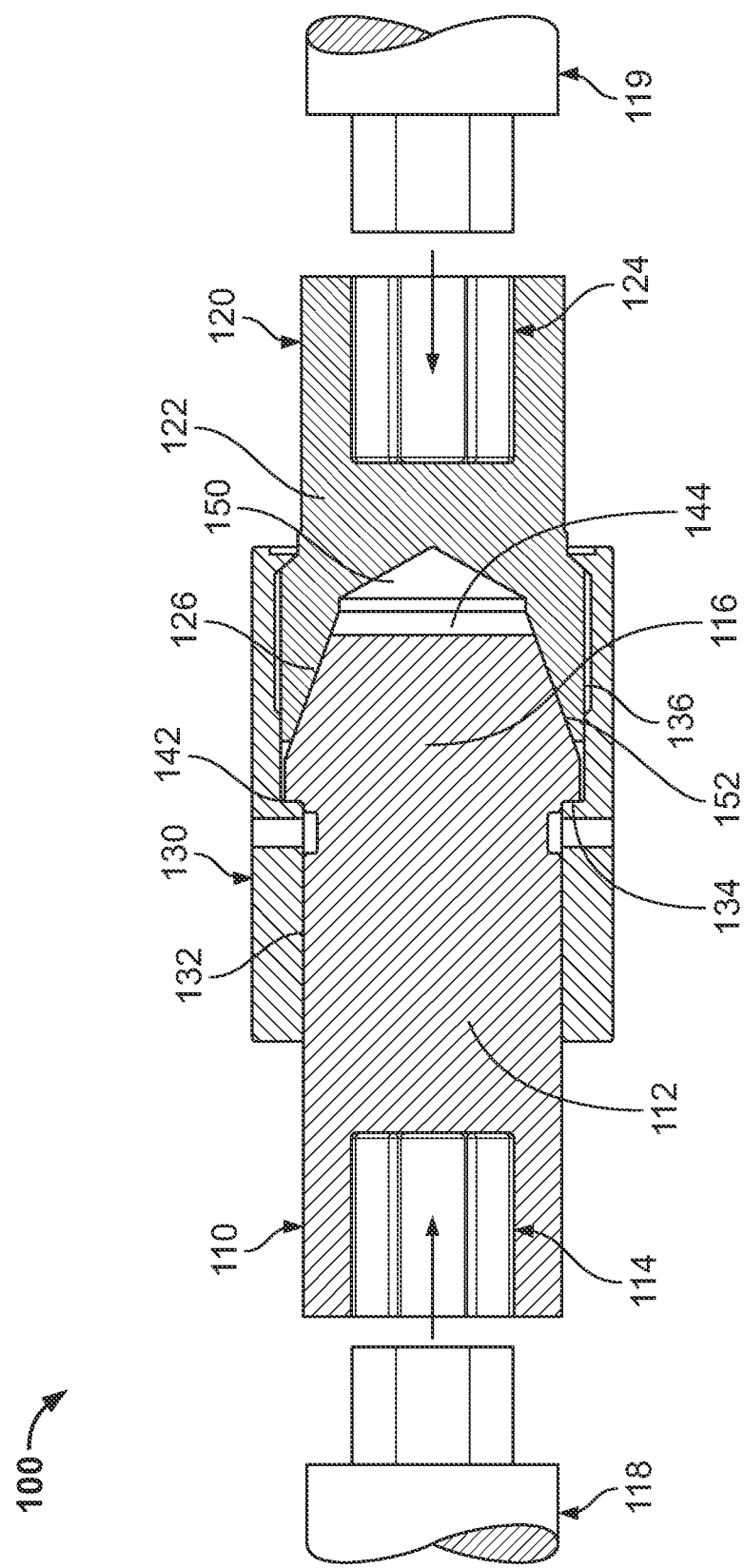
FIG. 1 depicts a system for coupling rotors of multiple permanent magnet motors, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art, that the specific detail need not be employed to practice the present embodiments. In other instances, well-known materials or methods have not been described in detail in order to avoid obscuring the present embodiments.

FIG. 1 depicts a system 100 for coupling rotors of multiple permanent magnet motors, according to an embodiment. System 100 may be configured to allow a male member coupled to a first rotor to be inserted into a female member coupled to a second rotor. Responsive to coupling the male member and the female member, stator electric winding coil phases associated with the multiple permanent magnet motors may be energized, which may rotate the rotors and corresponding male member and female member. While the stator electric winding coil phases are energized, a retention fastener may be tightened decreasing an internal diameter across the retention fastener to increase the friction between the male member and the female member to effectively lock the members together. The retention fastener may also be loosened to increase the internal diameter across the retention fastener to decrease the friction between the first and second members to unlock the members.

System 100 may include a first member 110, a second member 120, and a retention fastener 130.

First member 110 may be configured to be mechanically coupled to a rotor of a first permanent magnet motor. Responsive to the rotor rotating, first member 110 may rotate. First member 110 may include a body 112, first connector 114, and head 116.

Body 112 may be configured to extend from first connector 114 to head 116, and have a substantially uniform first diameter.

First connector 114 may be positioned within a first end of body 112. First connector 114 may be a hex, spline, keyed, square connector, or any other connector, that is configured to receive a rotor, driveshaft, etc. of a first permanent magnet motor 118, and transmit the rotational force received from the rotor of the first permanent magnet motor to body 112. Further, first connector 114 may allow for the rotor of the first permanent magnet motor to be inserted and removed from first member 110 without moving, rotating, etc. first member 110.

Head 116 may be positioned on a second end of body 112. Head 116 may include a first end 142 that has a second diameter, and a second end 144 that has a third diameter. In embodiments, the second diameter may be greater than the first diameter, and the third diameter may be less than the first diameter. The diameter of head may gradually taper from first end 142 to second end 144. This may increase the surface area of the sidewalls of head 116 between first end 142 and second end 144. Furthermore, because first end 142 has a larger diameter than that of body 112, first end 142 may act as a stopper for retention fastener 130, wherein retention fastener 130 may be configured to move axially along a central axis of body 112 until it is positioned adjacent to first end 142. In embodiments, head 116 may be configured to be positioned within second member 120, such that an outer surface of head 116 is physically positioned adjacent to portions of second member 120.

Second member 120 may be configured to be mechanically coupled to a rotor of a second permanent magnet motor. Responsive to the rotor of the second permanent magnet motor rotating, second member 120 may correspondingly rotate. Second member 120 may include body 122, second connector 124, and bore 126.

Body 122 may be configured to extend from second connector 124 to bore 126, and have a substantially uniform first diameter.

Second connector 124 may be positioned within a first end of body 122. Second connector 124 may be a hex, spline, keyed, square connector or any other connector that is configured to receive a rotor, driveshaft, etc. of a second permanent magnet motor 119, and transmit the rotational force received from the rotor of the second permanent magnet motor to body 122. Further, second connector 124 may allow for the rotor of the second permanent magnet motor to be inserted and removed from second member 120 without moving, rotating, etc. second member 120.

Bore 126 may be positioned on a second end of body 122. Bore 126 may be a cutout, depression, slot, etc. positioned on the second end of body 122. Bore 126 may be configured to receive head 116 of first member 120, such that bore 126 may encompass head 116. Bore 126 may have a first end 150 that has a fourth diameter, and a second end 152 with a fifth diameter. The fourth diameter of first end 150 may be smaller in size than first end 142 of first member 110, and the fifth diameter of second end 152 may have a larger diameter of first end 142 of first member 110. In embodiments, the inner diameter of bore 126 may gradually increase from fourth diameter to second diameter at an angle that corresponds to the taper of head 116. This may allow an outer surface of head 116 to be positioned adjacent to an inner surface of bore 126, while maximizing the contact surface between head 116 and bore 126.

Retention fastener 130 may be configured to be tightened and loosened to apply a variable amount of pressure towards a central axis of system 100. Retention fastener 130 has a variable sized inner diameter 132 that is configured to apply the variable amount of pressure towards a central axis of system 100 against an outer diameter of second member 120. Retention fastener 130 may include first portion 132, lip 134, and second portion 136. When retention fastener 130 is positioned over first member 110 and second member 120, first portion 132 may be positioned adjacent to the outer circumference of body 112, and second portion 136 may be positioned adjacent to the outer circumference of bore 126. Furthermore, lip 134 may be positioned adjacent to first end 142 of head 116. In embodiments, the variable amount of pressure created by retention fastener 130 may be based on retention fastener 130 having a variable diameter, which may vary by rotating retention fastener 130. When retention fastener 130 applies a lower amount of friction against first member 110 and second member 120, retention fastener 130 may have a larger inner diameter that allows first member 110 and second member 120 to freely and independently rotate. In embodiments, when retention fastener 130 applies the lower amount of friction, the alignment of the first permanent magnet motor and the second permanent magnet motor may be facilitated. Responsive to rotating retention fastener 130 in a first direction while positioned over first member 110 and second member 120, the inner diameter of fastener 130 may decrease to apply a higher amount of friction against first member 110 and second member 120. This may cause first member 110 and second member 120 to be locked together. By locking the alignment of first member 110 and second member 120, the synchronization and alignment of the first permanent magnet motor and the second permanent magnet motor may remain aligned when first member 110 and second member 120 correspondingly rotate.

Figure 2:
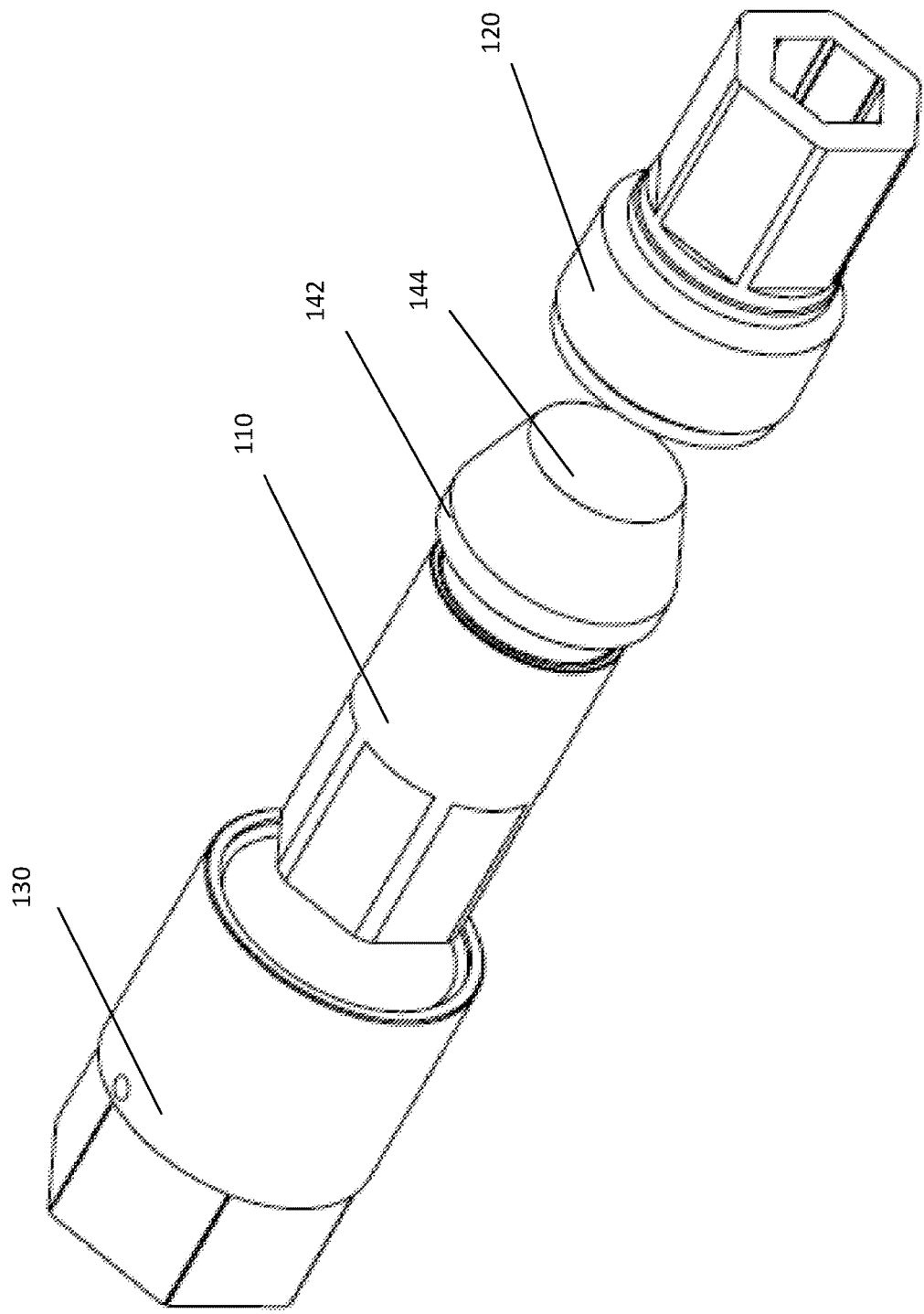
FIG. 2 depicts a system in a first mode of operation, according to an embodiment.

FIG. 2 depicts system 100 in a first mode of operation, according to an embodiment. Elements depicted in FIG. 2 may be described above, and for the sake of brevity a further description of these elements is omitted.

As depicted in FIG. 2, in the first mode of operation, retention fastener 130 may be disengaged from head 116 of first member 110. When retention fastener 130 is disengaged from head 116, retention fastener 130 is not encompassing head 116. This may allow head 116 of first member 110 to be exposed and inserted into bore 126 of second member 120.

Figure 3:
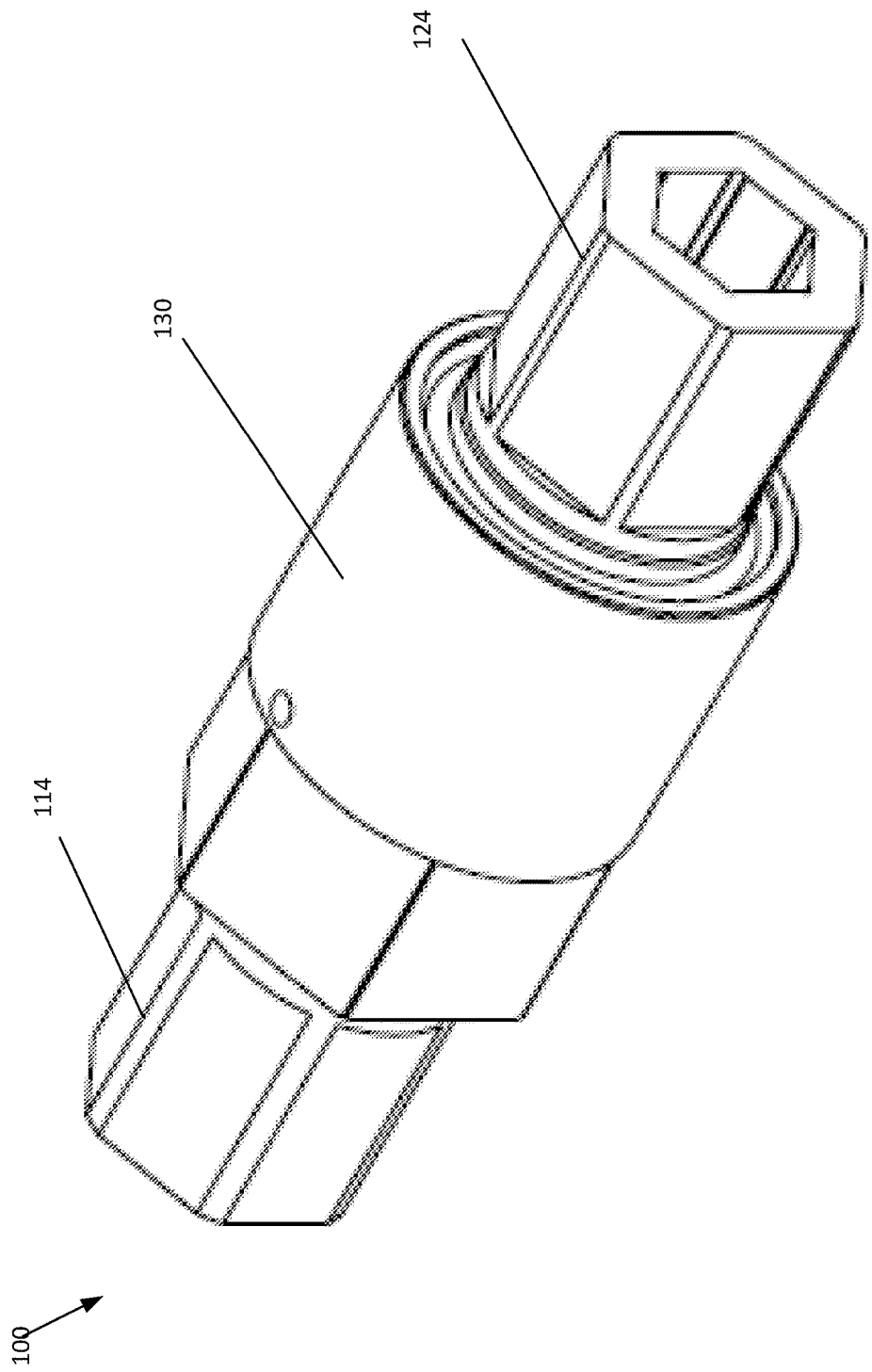
FIG. 3 depicts an external view of a system in a second mode of operation, according to an embodiment.

FIG. 3 depicts an external view of system 100 in a second mode of operation, according to an embodiment. Elements depicted in FIG. 3 may be described above, and for the sake of brevity a further description of these elements is omitted.

In the second mode of operation, retention fastener 130 may be axially slid over head 116 of first member 110 and bore 126 of second member 120. When engaged with head 116 and bore 126, retention fastener 130 may be rotated in a first direction to shoulder lip 134 into first member 110. This may cause friction between head 116 of first member 110 and bore 126 of second member 120 through a compressive force towards a central axis of system 100, which may lock first member 110 and second member 120 together. Responsive to rotating retention fastener 130 in a second direction, the compressive force decreases between first member 110 and second member 120. This may allow for the independent rotation of first member 110 and second member 120.

Figure 4:
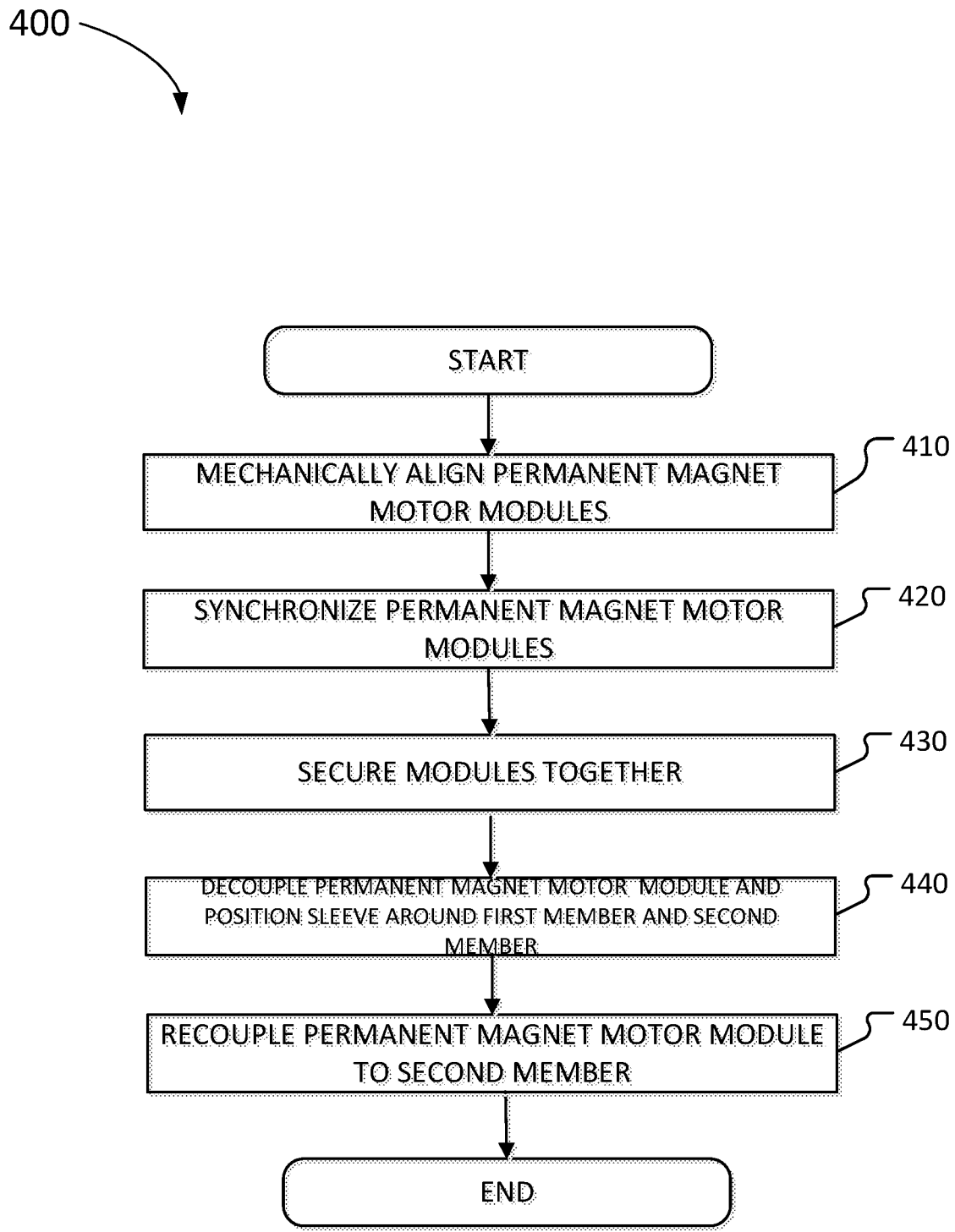
FIG. 4 depicts a method for coupling two permanent magnet motors together, according to an embodiment

FIG. 4 depicts a method 400 for coupling two permanent magnet motors together, according to an embodiment. The operations of the method presented below are intended to be illustrative. In some embodiments, the method may be accomplished with one or more additional operations not described, and/or without one or more of the operations discussed. Additionally, the order in which the operations of the method are illustrated in FIG. 4 and described below is not intended to be limiting.

At operation 410, a first permanent magnet motor and a second permanent magnet motor with similar stator electric winding coil patterns may be concentrically aligned and a first member may be positioned on the end of the rotor associated with the first permanent magnet motor, and a second member may be positioned on the end of the rotor associated with the second permanent magnet motor. The first permanent magnet motor and the second permanent magnet motor may be coupled together by inserting a head of the first member into the bore of the second member. This may mechanically align the first member and the second member.

At operation 420, bore while coupling the first member and second member, the stator electric winding coil phases of the first permanent magnet motor and the second permanent magnet motor may be synchronized and aligned by applying electricity to the stator electric winding coil phases of the windings of the first permanent magnet motor and the second permanent magnet motor.

At operation 430, a retention fastener may axially move along the central axis of the system to encompass the first member and the second member, while the stator electric winding coil phases and rotor magnetic fields of the first permanent magnet motor and the second permanent magnet motor are synchronized. Then, the retention fastener may be rotated in a first direction to rotationally lock the first permanent magnet motor and the second permanent magnet motor together through the first and second member At operation 440, the second permanent magnet motor may be decoupled from the second member while the first member and the second member remain coupled together via the retention fastener. While the second permanent magnet motor is decoupled, an inner sleeve and flange adapter may be positioned around the system to further mechanically secure the first permanent magnet motor and the second permanent magnet motor together.

At operation 450, the second permanent magnet motor may be recoupled with the second member, while the first member and the second member are mechanically aligned together. This may allow the rotors of multiple permanent magnet motors to be coupled together and achieve alignment of their respective rotor magnetic fields to the stators. Because the first member and the second member were continuously aligned, the stator electric winding coil phases of the first permanent magnet motor and the second permanent magnet motor should remain synchronized when second permanent magnet motor module is recoupled with the second member.

In embodiments, these operations may be repeated for multiple permanent magnet motors, wherein a third permanent magnet motor may be coupled to a distal end of the second permanent magnet motor and/or a fourth permanent magnet motor may be coupled to a proximal end of the first permanent magnet motor or the fourth may be coupled to a distal end of the third permanent magnet motor. By coupling different numbers of permanent magnet motors together, any desired torque and/or horsepower rating may be created. In these embodiments, the rotors associated with each of the permanent magnet motors may include a first end with a first member and a second end with a second member. This may enable a plurality of any desired number of permanent magnet motors to be connected in series, enabling the transferring and summation of torque across multiple rotationally locked rotors of each of the permanent magnet motors connected in series.

Figure 5:
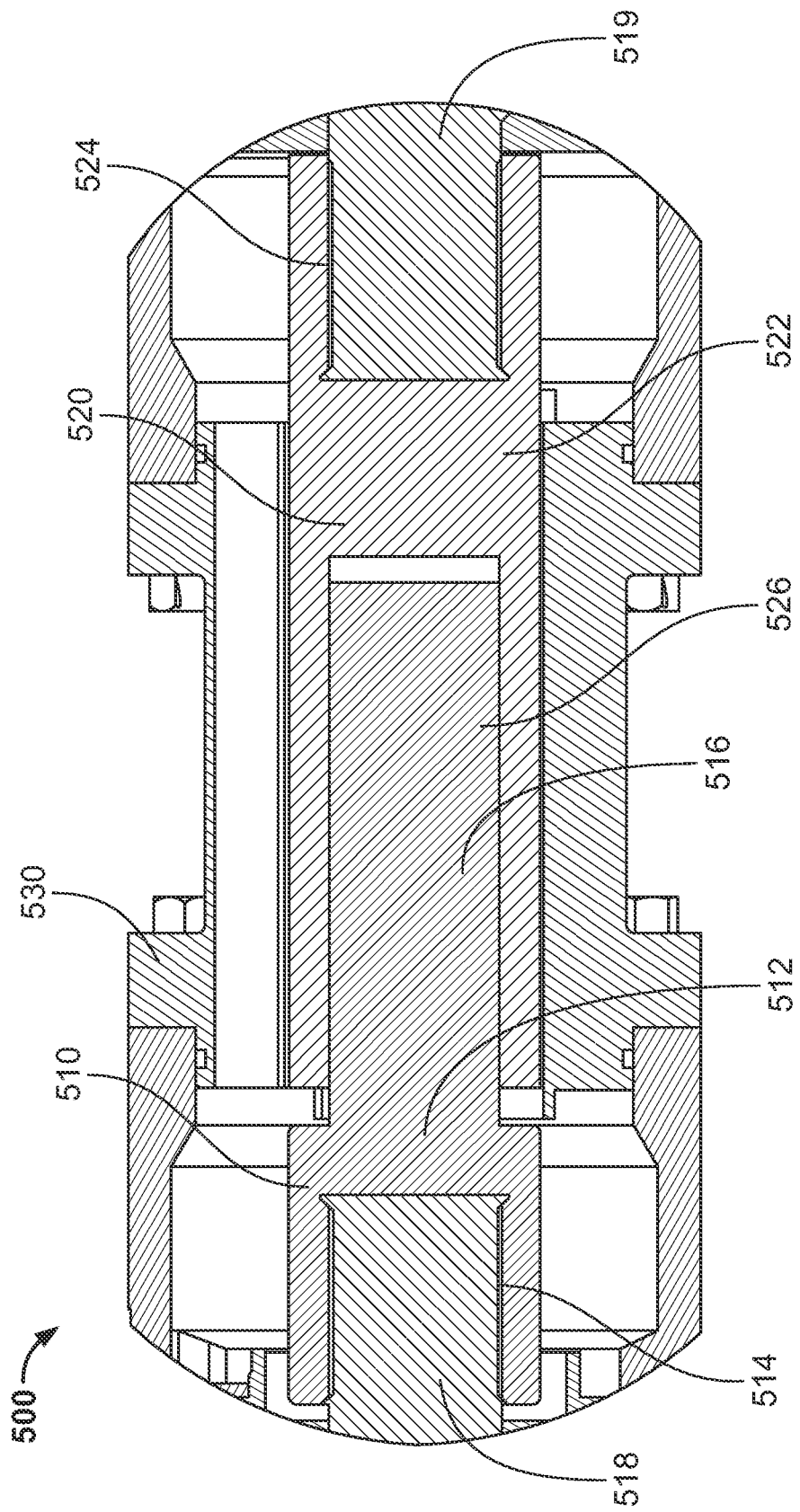
FIGS. 5-7 depict a system for coupling rotors of multiple permanent magnet motors, according to an embodiment.
Figure 6:
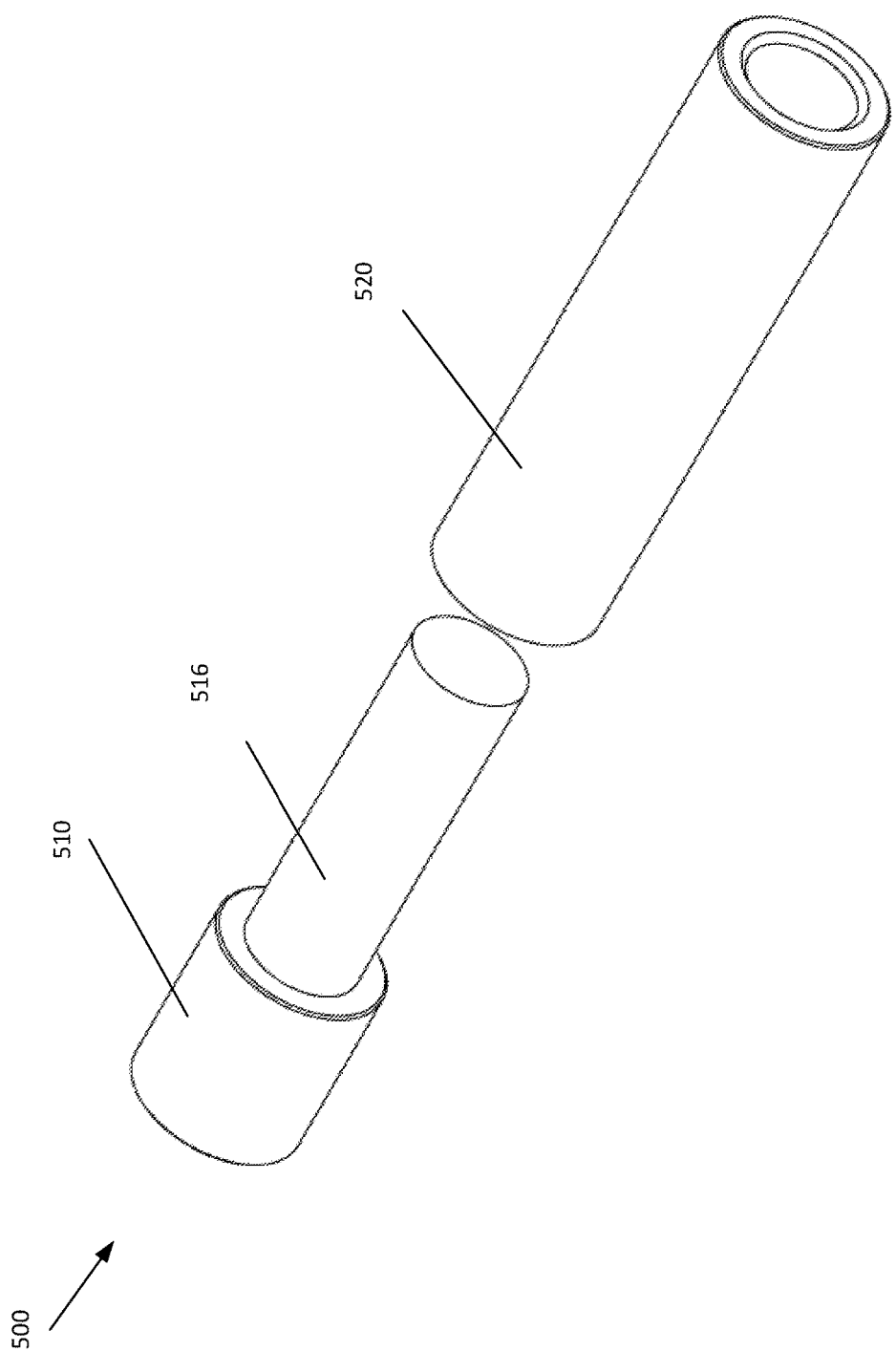
Figure 7:
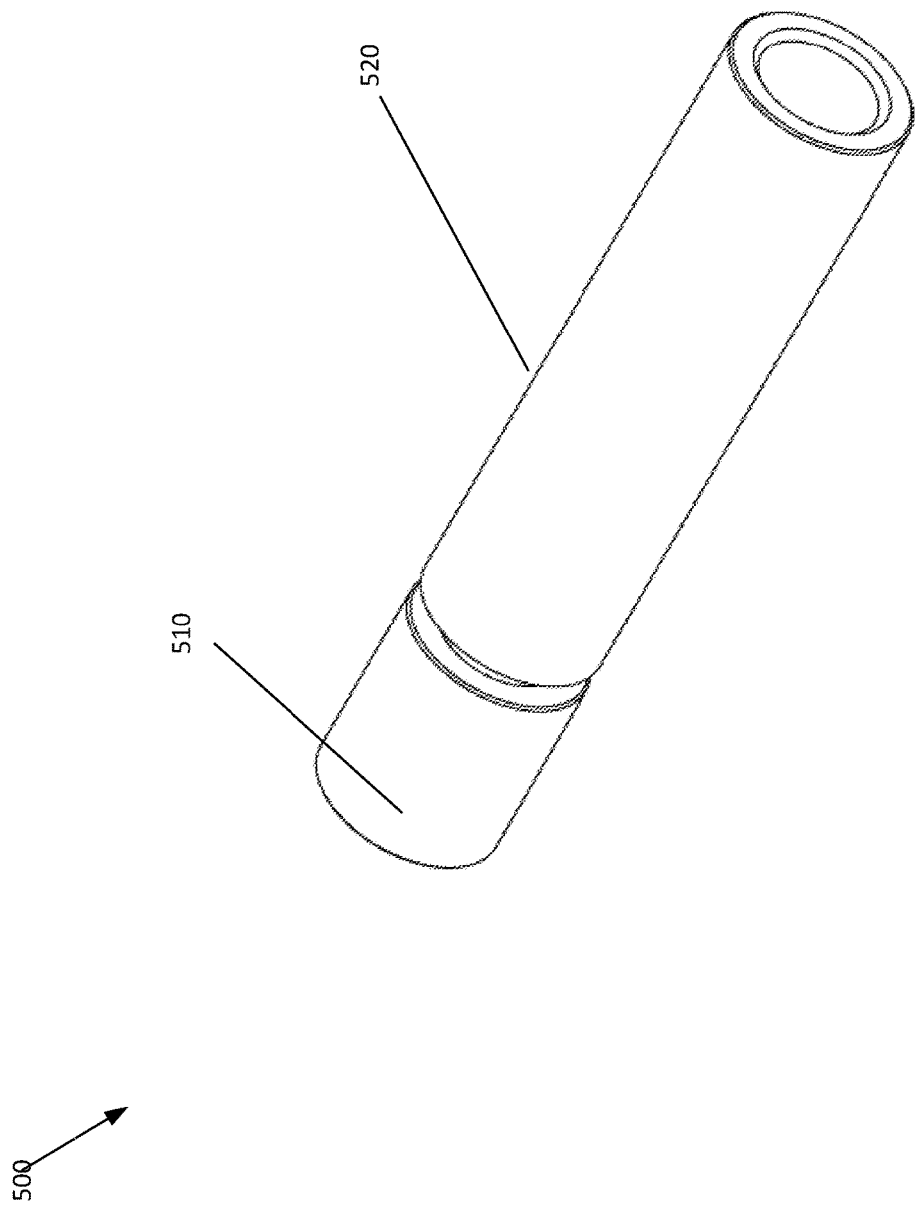

FIGS. 5-7 depict a system 500 for coupling driveshafts of multiple permanent magnet motors, according to an embodiment. Elements depicted in FIGS. 5-7 may be described above, and for the sake of brevity a further description of these elements is omitted.

As depicted in FIG. 5, system 500 may include a first member 510, second member 520, and a retention fastener 530.

First member 510 may be configured to be mechanically coupled to a rotor of a first permanent magnet motor. Responsive to the rotor rotating, first member 510 may correspondingly rotate. First member 510 may include a body 512, first connector 514, and head 516.

Body 512 may be configured to extend from first connector 514 to head 516. First connector 514 may be positioned on a first end of body 512, and may be configured to receive a rotor, driveshaft, etc. of a first permanent magnet motor 518. First connector 514 may be configured to transfer rotational forces received from the rotor of the first permanent magnet motor module to body 512. First connector 514 may also be configured to allow the rotor of the first permanent magnet motor to be inserted and removed from first member 510 without rotating body 512.

Head 516 may have a substantially uniform outer diameter. Head 516 may be configured to be inserted into second member 520, such that head 516 is encompassed by second member 520. In order to fit Head 516 into second member 520, first member 510 may need to be pressed into second member 520.

Second member 520 may be configured to be mechanically coupled to a rotor of a second permanent magnet motor. Responsive to the rotor of the second permanent magnet motor rotating, second member 520 may correspondingly rotate. Second member 520 may include body 522, second connector 524, and bore 526.

Body 522 may be configured to extend from a first end to a second end of second member 520 and have a substantially uniform outer diameter. Second connector 524 may be configured to be positioned on a second end of body 522, and may be a hex, spline, keyed, square connector or any other type of connector that is configured to receive a rotor, driveshaft, etc. of a second permanent magnet motor 519. Further, second connector 524 may be configured to transmit the rotational forces received from the rotor of the second permanent magnet motor to body 522. Second connector 524 may also enable the rotor of the second permanent magnet motor to be inserted and removed from second member 520 without moving, rotating, etc. second member 520.

Bore 526 may be positioned on a first end of body 522, and extend towards the second end of body 522. Bore 526 may be configured to receive head 516, such that bore 526 encompasses head 516. Bore 526 may have an inner diameter that is slightly smaller than that of head 516. Through press fitting, this may allow the outer diameter of head 516 to be positioned directly adjacent to the inner diameter of bore 526 while producing an interference fit.

As depicted in FIG. 6, first member 510 may include head 516 that is configured to be inserted into second member 520. As depicted in FIG. 7, responsive to inserting head 516 into second member 520, an internal face of first member 510 may be positioned adjacent to an internal face of second member 520. Through an interference fit, member 510 and member 520 may be locked rotationally to fix the alignment of the rotors.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for connecting rotors of multiple permanent magnet motors comprising:
    a first member configured to be coupled with a first rotor associated with a first permanent magnet motor, the first member including a head;
    a second member configured to be coupled with a second rotor associated with a second permanent magnet motor, the second member including a bore, wherein the bore is configured to receive the head;
wherein:
the head of the first member is configured to be moved axially along a central axis of the system to be inserted into the bore of the second member; and
the first member and second member are configured to be rotationally locked.

2. The system of claim 1, wherein the system is further configured for coupling a third permanent magnet motor in series with the first permanent magnet motor and the second permanent magnet motor.

3. The system of claim 1, wherein the first permanent magnet motor has a first phase, and the second permanent magnet motor has a second phase.

4. The system of claim 3, wherein the first member and the second member are configured to independently rotate to synchronize the first phase with the second phase.

5. The system of claim 4, wherein the first member and the second member are configured to transmit torque from the first rotor to the second rotor when the first member is rotationally locked with the second member.

6. The system of claim 5, further comprising a retention fastener, wherein the first member and the second member are rotationally locked by the retention fastener.

7. The system of claim 6, wherein the retention fastener is tightened to increase the friction between the head and the bore to secure the first permanent magnet motor to the second permanent magnet motor.

8. The system of claim 6, wherein the retention fastener comprises a sleeve and flange adaptor to secure the first permanent magnet motor to the second permanent magnet motor.

9. The system of claim 1, wherein the first permanent magnet motor and the second permanent magnet motor have similar stator electric coil winding patterns.

10. The system of claim 9, wherein the phases associated with the first permanent magnet motor and the second permanent magnet motor are configured to be aligned by allowing the first member to rotate relative to the second member when the first member is coupled to the second member and electricity is applied to stator electric coil windings of the first permanent magnet motor and the second permanent magnet motor.

11. The system of claim 10, wherein the second rotor is configured to be decoupled from the second member to allow the first member to be rotationally locked to the second member.

12. The system of claim 11, wherein the phases associated with the first permanent magnet motor and the second permanent magnet motor are configured to be aligned before rotationally locking the first member and the second member.

13. The system of claim 1, wherein the first member includes a first connector configured to receive the first rotor, and the second member includes a second connector to receive the second rotor.

14. The system of claim 1, wherein:
the first permanent magnet motor is rotationally locked in series with the second permanent magnet motor.

15. A method for connecting rotors of multiple permanent magnet motors comprising:
coupling a first rotor associated with a first permanent magnet motor with a first member of a system;
coupling a second rotor associated with a second permanent magnet motor with a second member of the system;
inserting a head associated with the first member into a bore associated with the second member by moving axially along a central axis of the system to couple the first member and the second member; and
rotationally locking the first member and the second member.

16. The method of claim 15, further comprising:
coupling a third permanent magnet motor in series with the first permanent magnet motor and the second permanent magnet motor; and
rotationally locking the third permanent magnet motor relative to the first permanent magnet motor and the second permanent magnet motor.

17. The method of claim 15, wherein the first permanent magnet motor has a first phase, and the second permanent magnet motor has a second phase.

18. The method of claim 17, further comprising:
independently rotating the first member and the second member are configured to synchronize the first phase with the second phase.

19. The method of claim 18, further comprising:
transmitting torque from the first rotor to the second rotor via the first member and the second member when the first member is coupled to the second member.

20. The method of claim 15, wherein the first permanent magnet motor and the second permanent magnet motor have similar stator electric coil winding patterns.

21. The method of claim 20, further comprising:
allowing the first member to rotate relative to the second member; and
aligning the phases associated with the first permanent magnet motor and the second permanent magnet motor when the first member is coupled to the second member and electricity is applied to stator electric coil windings of the first permanent magnet motor and the second permanent magnet motor.

22. The method of claim 21, further comprising:
decoupling the second rotor from the second member to allow the first member to the second member and the second member to be rotationally locked.

23. The method of claim 22, further comprising:
aligning the phases associated with the first permanent magnet motor and the second permanent magnet motor before rotationally locking the first member to the second member.

24. The method of claim 15, further comprising:
coupling the first rotor to the first member via a first connector on the first member; and
coupling the second rotor to the second member via a second connector on the second member.

25. The method of claim 15, further comprising installing a retention fastener, wherein the first member and the second member are rotationally locked by the retention fastener.

26. The method of claim 25, wherein the retention fastener is tightened to increase the friction between the head and the bore to secure the first permanent magnet motor to the second permanent magnet motor.

27. The method of claim 25, wherein the retention fastener comprises a sleeve and flange adaptor to secure the first permanent magnet motor to the second permanent magnet motor.

* * * * *